United States Patent
Duplys et al.

(10) Patent No.: US 11,706,235 B2
(45) Date of Patent: Jul. 18, 2023

(54) METHOD AND DEVICE FOR PROCESSING DATA OF A TECHNICAL SYSTEM

(71) Applicant: Robert Bosch GmbH, Stuttgart (DE)

(72) Inventors: Paulius Duplys, Markgroeningen (DE); Philipp Jung, Pfinztal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 35 days.

(21) Appl. No.: 17/329,953

(22) Filed: May 25, 2021

(65) Prior Publication Data

US 2022/0046041 A1    Feb. 10, 2022

(30) Foreign Application Priority Data

Aug. 6, 2020   (DE) .......................... 102020209993.6

(51) Int. Cl.
*H04L 29/06*    (2006.01)
*H04L 9/40*    (2022.01)

(52) U.S. Cl.
CPC ...... *H04L 63/1425* (2013.01); *H04L 63/1416* (2013.01); *H04L 63/1441* (2013.01); *H04L 63/166* (2013.01)

(58) Field of Classification Search
CPC ............. H04L 63/1425; H04L 63/1416; H04L 63/1441; H04L 63/166
See application file for complete search history.

(56) References Cited

U.S. PATENT DOCUMENTS

| | | | | |
|---|---|---|---|---|
| 9,300,679 | B1* | 3/2016 | Martin | H04L 63/1433 |
| 10,511,505 | B2* | 12/2019 | Das | H04L 43/08 |
| 2009/0282478 | A1* | 11/2009 | Jiang | H04L 63/1458 |
| | | | | 707/E17.014 |
| 2015/0067844 | A1* | 3/2015 | Brandt | H04L 69/329 |
| | | | | 726/22 |
| 2020/0175171 | A1* | 6/2020 | Rieger | G06F 21/577 |
| 2020/0322353 | A1* | 10/2020 | Bhandari | H04L 63/1425 |
| 2021/0194815 | A1* | 6/2021 | Barton | H04L 43/20 |
| 2021/0303984 | A1* | 9/2021 | Lan | G06N 5/04 |

\* cited by examiner

*Primary Examiner* — Kambiz Zand
*Assistant Examiner* — Afaq Ali
(74) *Attorney, Agent, or Firm* — Norton Rose Fulbright US LLP; Gerard Messina

(57) ABSTRACT

A method, in particular a computer-implemented method, for processing data of a technical system. The method includes the following steps: ascertaining first pieces of information which are associated with a data traffic of the system, and ascertaining metadata associated with the data traffic of the system based on the first pieces of information.

15 Claims, 3 Drawing Sheets

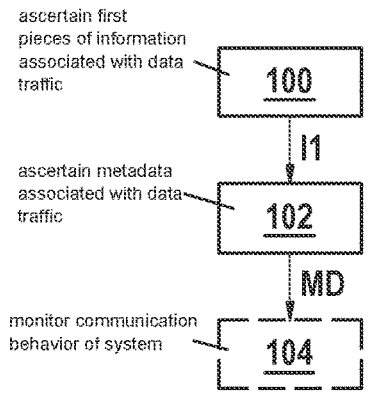
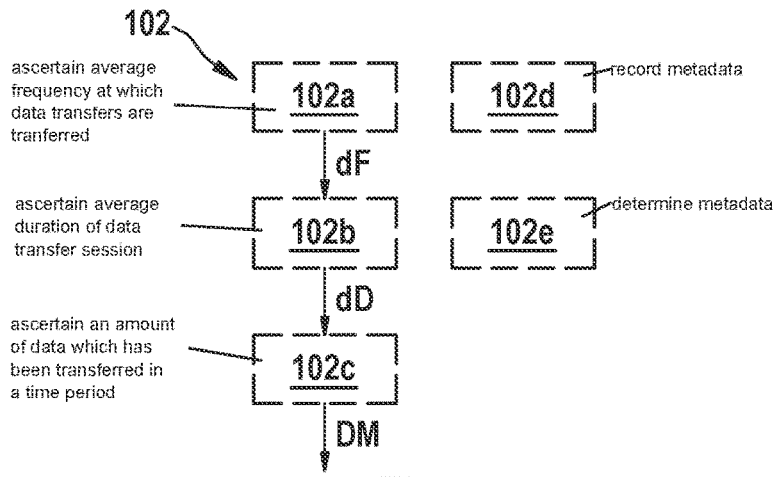
Fig. 1
Fig. 2
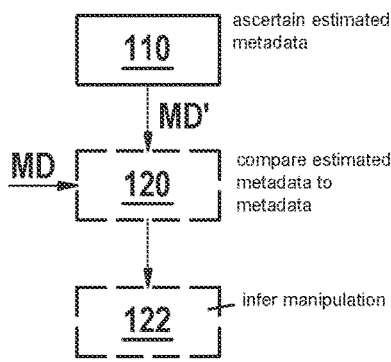
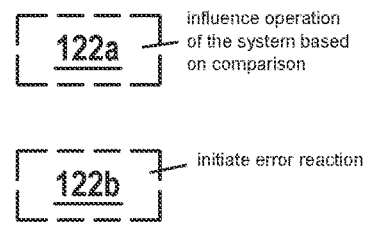
Fig. 3
Fig. 4

METHOD AND DEVICE FOR PROCESSING DATA OF A TECHNICAL SYSTEM

CROSS REFERENCE

The present application claims the benefit under 35 U.S.C. § 119 of German Patent Application No. DE 102020209993.6 filed on Aug. 6, 2020, which is expressly incorporated herein by reference in its entirety.

FIELD

The present invention relates to a method for processing data of a technical system, for example, a sensor system.

The present invention furthermore relates to a device for processing data of a technical system, for example, a sensor system.

SUMMARY

Exemplary specific embodiments of the present invention relate to a method, in particular a computer-implemented method, for processing data of a technical system, for example, a sensor system, including the following steps: ascertaining first pieces of information which are associated with a data traffic of the system, ascertaining metadata associated with the data traffic of the system based on the first pieces of information. In further exemplary specific embodiments, the metadata enable monitoring of the communication behavior of the system, for example, also with respect to unusual patterns.

In further exemplary specific embodiments of the present invention, the data traffic of the system includes data transfers from the system to another unit, and/or data transfers from one or the other unit (or at least one further unit) to the system.

In further exemplary specific embodiments of the present invention, the other unit is a gateway, which is designed, for example, to relay data received by the sensor system to a further unit, for example a public network (for example, the Internet) or a (virtual) private network or an edge computing system or a cloud system.

In further exemplary specific embodiments of the present invention, the data traffic may include wired and/or wireless data transfers. In further exemplary specific embodiments, the data traffic may use TCP/IP, for example, as a protocol (or protocols).

In further exemplary specific embodiments of the present invention, the ascertainment of the metadata includes at least one of the following elements: a) ascertaining an average frequency at which the data transfers of the data traffic are transferred, for example data transfers from the system to a receiver, for example the gateway, b) ascertaining an average duration of a data-transfer session, for example a transport layer security (TLS) session, c) ascertaining an amount of data which has been transferred in a time period, which is predefinable, for example, from the system and/or to the system, the time period being an hour or a day, for example.

In further exemplary specific embodiments of the present invention, the ascertainment of the metadata includes: Recording and/or determining the metadata. For example, in further exemplary specific embodiments, the metadata may form a part of the first pieces of information, the ascertainment of the metadata having as the subject, for example, a separation of the metadata, for example, from useful data (for example, "payload") of the first pieces of information.

For example, in further exemplary specific embodiments, the metadata may be derivable from the first pieces of information.

In further exemplary specific embodiments of the present invention, the method furthermore includes: Ascertaining estimated metadata based on data transfers of the system.

In further exemplary specific embodiments of the present invention, the ascertainment of the estimated metadata includes: Using at least one model which is designed to ascertain the estimated metadata based on the data transfers of the system. In contrast to the ascertainment of the metadata, for example, in the form of the recording or determining from the first pieces of information, the estimated metadata are accordingly obtained in further exemplary specific embodiments using at least one model based on the data transfers of the system.

In further exemplary specific embodiments of the present invention, the at least one model may include one or multiple submodels.

In further exemplary specific embodiments of the present invention, the method furthermore includes: Comparing the estimated metadata to the metadata. In further exemplary specific embodiments, for example, in the case of a deviation of the metadata from the estimated metadata exceeding a predefinable amount, an unusual behavior of the system with respect to its data traffic may be inferred, for example, an attack or a manipulation.

In further exemplary specific embodiments of the present invention, the metadata may be transmitted to, for example, a unit, which carries out the comparison of the estimated metadata to the metadata.

In further exemplary specific embodiments of the present invention, for example, a first functionality may be provided, which is associated with, for example, a gateway or is implemented by the gateway, to which the system is connected for data communication. In further exemplary specific embodiments, the first functionality may detect or collect the metadata.

In further exemplary specific embodiments of the present invention, for example, a second functionality may be provided, which is associated with, for example, an edge server or cloud server or a network in general or is implemented thereby, using which the system may establish a data connection, for example, via the gateway. In further exemplary specific embodiments, the second functionality may ascertain the estimated metadata and/or compare the estimated metadata to the metadata detected or collected, for example, by the first functionality. In further exemplary specific embodiments, for example, the first functionality may send the metadata collected thereby to the second functionality.

In further exemplary specific embodiments of the present invention, the method furthermore includes: a) influencing an operation of the system based on the comparison, and/or b) initiating an error reaction based on the comparison.

Further exemplary specific embodiments of the present invention relate to a device for carrying out the method according to the specific embodiments of the present invention.

In further exemplary specific embodiments of the present invention, the device includes: A processing unit, a memory unit associated with the processing unit for at least temporarily storing at least one of the following elements: a) data, b) a computer program, for example for carrying out the method according to the specific embodiments or at least one or some steps of the method according to the specific embodiments.

Further exemplary specific embodiments of the present invention relate to a computer-readable memory medium (for example magnetic and/or optical and/or semiconductor memory), including commands which, when they are executed by a computer (for example, the above-mentioned processing unit), prompt it to carry out the method according to the specific embodiments.

Further exemplary specific embodiments of the present invention relate to a computer program, including commands which, when the program is executed by a computer, prompt it to carry out the method according to the specific embodiments of the present invention.

Further exemplary specific embodiments of the present invention relate to a data carrier signal which characterizes and/or transmits the computer program according to the specific embodiments of the present invention.

Further exemplary specific embodiments of the present invention relate to a use of the method according to the specific embodiments and/or the device according to the specific embodiments and/or the computer program according to the specific embodiments and/or the data carrier signal according to the specific embodiments for at least one of the following elements: a) evaluating data of the technical system, b) recognizing attempted attacks, for example carrying out a method for recognizing attacks, for example an intrusion detection method, c) carrying out a cloud-based intrusion detection method, for example for a system including at least one sensor or at least one sensor unit.

Further exemplary specific embodiments of the present invention relate to a cloud server or an edge computing server including at least one device or at least a part of the functionality of the device according to the specific embodiments. In this way, particularly efficient monitoring of one or multiple technical systems is enabled, for example for attacks of third parties, whereby, for example, an IDS may be provided, in particular, for example, for a plurality of systems, for example, sensor systems or IoT systems.

Further exemplary specific embodiments of the present invention relate to a gateway or another element for network coupling to at least one device or at least a part of the functionality of the device according to the specific embodiments.

The features according to exemplary specific embodiments of the present invention may—also outside of edge and/or cloud computing systems—advantageously be used for efficiently providing a system for recognizing attacks (intrusion detection system (IDS)), for example for providing an IDS for IoT systems and/or industry 4.0 systems.

Further advantageous embodiments of the present invention result from the following description and the figures.

BRIEF DESCRIPTION OF THE DRAWINGS

FIG. 1 schematically shows a simplified flowchart of a method according to exemplary specific embodiments of the present invention.

FIG. 2 schematically shows a simplified flowchart according to further exemplary specific embodiments of the present invention.

FIG. 3 schematically shows a simplified flowchart according to further exemplary specific embodiments of the present invention.

FIG. 4 schematically shows a simplified flowchart according to further exemplary specific embodiments of the present invention.

DETAILED DESCRIPTION OF EXAMPLE EMBODIMENTS

Figure 5:
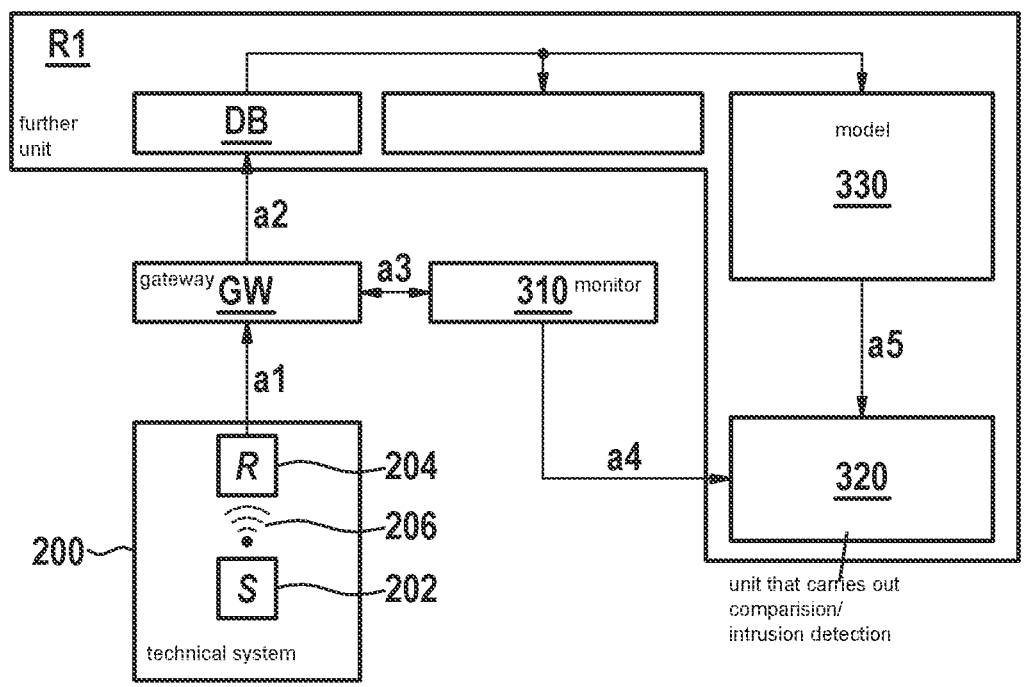
FIG. 5 schematically shows a simplified block diagram of a device according to further exemplary specific embodiments of the present invention.

FIG. 1 schematically shows a simplified flowchart of a method, in particular a computer-implemented method, for processing data of a technical system 200, for example a sensor system 200, as is shown by way of example in FIG. 5. Sensor system 200 includes, for example, at least one sensor unit 202, which sends, for example, sensor data, in the present case wirelessly by way of example, to a sensor data receiver 204, cf. the wireless data communication link 206. In further exemplary specific embodiments, sensor data receiver 204 sends the received sensor data, in the present case, for example, using a TCP/IP-based data transfer a1, to another unit, in the present case, for example, a gateway GW.

The method, cf. FIG. 1, includes the following steps: ascertaining 100 first pieces of information I1, which are associated with a data traffic a1 (FIG. 5) of system 200, ascertaining 102 (FIG. 1) metadata MD associated with data traffic a1 of system 200 based on first pieces of information I1. Metadata MD enable, in further exemplary specific embodiments, monitoring of the communication behavior of system 200, for example also for unusual patterns, which is symbolized, for example, by optional block 104.

In further exemplary specific embodiments, data traffic a1 (FIG. 5) of system 200 includes data transfers from system 200 to another unit GW, R1, and/or data transfers from one or the other unit GW, R1 (or at least one further unit) to system 200.

In further exemplary specific embodiments, the other unit is a gateway GW, which is designed, for example, to pass on data a1 received from sensor system 200 to a further unit R1, for example, a public network (for example the Internet) or a (virtual) private network or an edge computing system or a cloud system.

In further exemplary specific embodiments, data traffic a1, a2 may include wired and/or wireless data transfers. In further exemplary specific embodiments, data traffic a1, a2 may use, for example, TCP/IP as the protocol(s).

In further exemplary specific embodiments, the ascertainment 102 (FIG. 1) of metadata MD includes at least one of the following elements, cf. FIG. 2: a) ascertaining 102a an average frequency dF, at which the data transfers of data traffic a1, a2 are transferred, for example data transfers a1 from system 200 to a receiver GW, for example gateway GW, b) ascertaining 102b an average duration dD of a data transfer session, for example a transport layer security (TLS) session (for example between system 200 and a communication partner (not shown), which has a data link to network R1), c) ascertaining 102c an amount of data DM which has been transferred in a time period, which is predefinable, for example, from system 200 and/or to system 200, the time period being, for example, one hour or one day.

In further exemplary specific embodiments, ascertaining 102 (FIG. 1) the metadata includes, cf. FIG. 2: recording 102d and/or determining 102e metadata MD. For example, in further exemplary specific embodiments, metadata MD may form a part of first pieces of information I1, the ascertainment 102 of metadata MD having as the subject separating metadata MD, for example, from useful data (for example "payload") of first pieces of information I1. For example, in further exemplary specific embodiments, metadata MD may be derivable from the first pieces of information.

In further exemplary specific embodiments, cf. FIG. 3, the method furthermore includes: ascertaining 110 estimated metadata MD' based on data transfers a1, a2 of system 200.

In further exemplary specific embodiments, ascertaining 110 of estimated metadata MD' includes: using at least one model (for example implemented in block 330 from FIG. 5), which is designed to ascertain estimated metadata MD' based on the data transfers of the system. In contrast to the ascertainment 102 (FIG. 1) of metadata MD, for example, in the form of the recording or determining from first pieces of information I1, estimated metadata MD' are accordingly obtained in further exemplary specific embodiments using at least one model based on data transfers a1, a2 of the system.

In further exemplary specific embodiments, the method furthermore includes: comparing 120 estimated metadata MD' to metadata MD. In further exemplary specific embodiments, for example, in the event of a deviation of metadata MD from estimated metadata MD' exceeding a predefinable amount, an unusual behavior of system 200 with respect to its data traffic may be inferred, for example an attack or a manipulation. The inference of the manipulation may take place, for example, in optional step 122.

In further exemplary specific embodiments, metadata MD may be transferred, for example, to a unit 320 (FIG. 5), which carries out the comparison of the estimated metadata to the metadata.

In further exemplary specific embodiments, for example, a first functionality 310 (FIG. 5) may be provided, which may be referred to in further exemplary specific embodiments, for example, as a "monitor" and which is associated with, for example, one or the gateway GW (FIG. 5) or is implemented by gateway GW, to which system 200 is connected for data communication, cf. arrow a1. In further exemplary specific embodiments, the first functionality may detect or collect metadata MD.

In further exemplary specific embodiments, for example, a second functionality 320, 330 may be provided, which is associated, for example, with an edge server or cloud server or a network R1 in general or is implemented thereby, with which system 200 may establish a data connection a2, for example via gateway GW. In further exemplary specific embodiments, second functionality 320, 330 or a part 330 thereof may ascertain estimated metadata MD' and/or compare estimated metadata MD' to the metadata detected or collected, for example, by the first functionality (block 320). In further exemplary specific embodiments, for example, the first functionality may send the metadata collected by it to the second functionality.

In further exemplary specific embodiments, block 330 may also be understood as a digital twin of system 200, because it ascertains, for example, estimated metadata MD'.

In further exemplary specific embodiments, block 320 may also be understood, for example, as a (part of an) intrusion detection system.

Arrow a3 symbolizes a data connection between gateway GW and monitor functionality 310 according to further exemplary specific embodiments. Arrow a4 symbolizes a data connection between monitor functionality 310 and block 320 according to further exemplary specific embodiments. Arrow a5 symbolizes a data connection between block 320 and block 330 according to further exemplary specific embodiments.

In further exemplary specific embodiments, a database DB may be provided, for example, in network R1, which at least partially records, for example, a data traffic a1, a2 of sensor system 200.

In further exemplary specific embodiments, cf. FIG. 4, the method furthermore includes: a) Influencing 122a an operation of system 200 based on comparison 120 (FIG. 3), and/or b) initiating 122b (FIG. 4) an error reaction based on the comparison.

Figure 7:
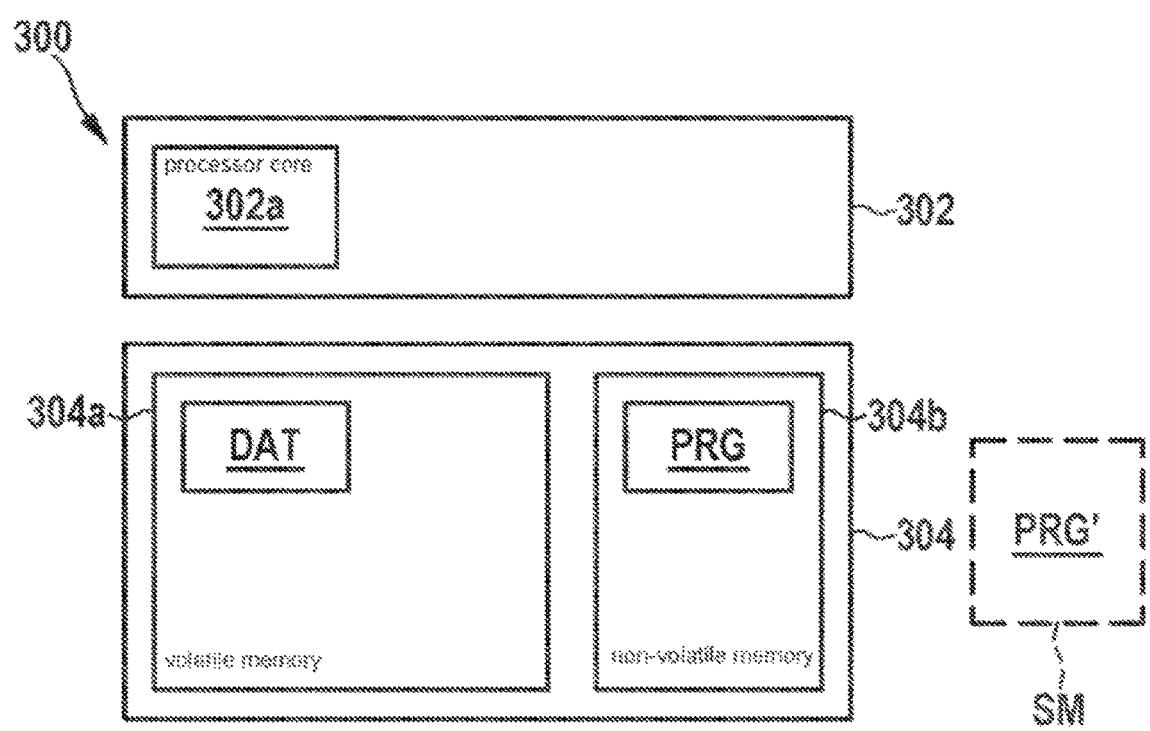
FIG. 7 schematically shows a simplified block diagram of a device according to further exemplary specific embodiments of the present invention.

Further exemplary specific embodiments, cf. FIG. 7, relate to a device 300 for carrying out the method according to the specific embodiments.

In further exemplary specific embodiments, device 300 includes: A processing unit 302 including at least one processor core 302a, a memory unit 304 associated with processing unit 302 for at least temporarily storing at least one of the following elements: a) data DAT (for example data traffic of system 200 and/or metadata MD or estimated metadata MD'), b) computer program PRG, for example for carrying out the method according to the specific embodiments or at least one or some steps of the method according to the specific embodiments.

In further exemplary specific embodiments, processing unit 302 includes at least one of the following elements: a microprocessor, a microcontroller, a digital signal processor (DSP), a programmable logic component (for example, FPGA (field programmable gate array)), an ASIC (application-specific integrated circuit), a graphic processor (GPU), a tensor processor, or a hardware circuit. Combinations thereof are also possible in further exemplary specific embodiments, as is a distributed arrangement of at least some components, for example on various elements of network R1 (FIG. 5).

Memory unit 304 may include, for example, a volatile memory (304a (for example RAM (random-access memory)) and/or 304b a nonvolatile memory (for example flash EEPROM).

Further exemplary specific embodiments relate to a computer-readable memory medium SM (for example magnetic and/or optical and/or semiconductor memory), including commands PRG', which, when executed by a computer 302, prompt it to carry out the method according to the specific embodiments.

Further exemplary specific embodiments relate to a computer program PRG, including commands which, when program PRG is executed by a computer 302, prompt it to carry out the method according to the specific embodiments.

Further exemplary specific embodiments relate to a data carrier signal DCS, which characterizes and/or transmits computer program PRG according to the specific embodiments. For example, device 300 may include an optional data interface DCS for transmitting, for example, data carrier signal DCS and/or for transmitting other pieces of information I1, MD, MD'.

In further exemplary specific embodiments, for example, at least one of blocks 310, 320, 330 from FIG. 5 may have the configuration specified by way of example in FIG. 7 or at least a similar configuration.

Figure 6:
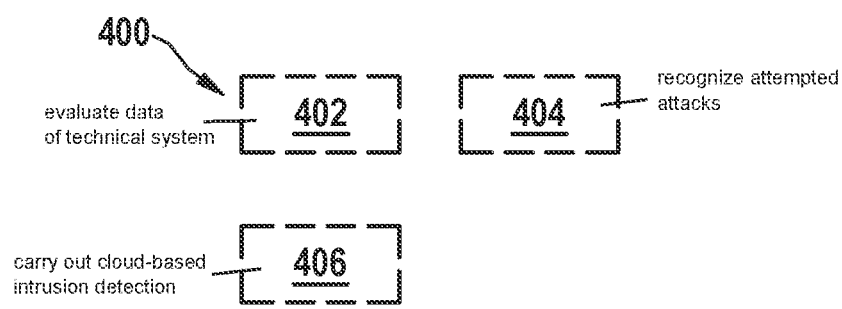
FIG. 6 schematically shows aspects of uses according to further exemplary specific embodiments of the present invention.

Further exemplary specific embodiments, cf. FIG. 6, relate to a use 400 of the method according to the specific embodiments and/or the device according to the specific embodiments and/or the computer program according to the specific embodiments and/or the data carrier signal according to the specific embodiments for at least one of the following elements: a) evaluating 402 data of the technical system, b) recognizing 404 attempted attacks, for example carrying out a method for recognizing attacks, for example an intrusion detection method, c) carrying out 406 a cloud-based intrusion detection method, for example for a system 200 including at least one sensor or at least one sensor unit 202.

Further exemplary specific embodiments relate to a cloud server or an edge computing server including at least one device 300 or at least one part 310, 320, 330 of the functionality of the device according to the specific embodiments. In this way, particularly efficient monitoring of one or multiple technical systems 200, for example, for attacks by third parties, is enabled, whereby, for example, an IDS may be provided, in particular, for example, for a plurality of systems, for example sensor systems or IoT systems.

Further exemplary specific embodiments relate to a gateway GW or another element for network coupling to at least one device or at least a part of the functionality of the device according to the specific embodiments.

The features according to exemplary specific embodiments may—also outside of edge and/or cloud computing systems—advantageously be used for efficiently providing a system for recognizing attacks (intrusion detection system (IDS)), for example for providing an IDS for IoT systems and/or industry 4.0 systems.

What is claimed is:

1. A computer-implemented method for processing data of a technical system, comprising the following steps:
   monitoring a data traffic of the technical system, thereby ascertaining first pieces of information;
   ascertaining, as metadata and based on the first pieces of information, at least one of an average frequency at which data transfers of the data traffic occur and an average duration of data transfer sessions of the data traffic; and
   influencing an operation of the technical system based on the ascertained metadata.

2. The method as recited in claim 1, wherein the ascertaining is of the average frequency at which the data transfers of the data traffic occur.

3. The method as recited in claim 2, wherein the data transfers of the data traffic are from the technical system to a receiver.

4. The method as recited in claim 1, wherein the ascertaining of the metadata includes recording and/or determining the metadata.

5. The method as recited in claim 1, furthermore comprising:
   ascertaining estimated metadata based on the data transfers of the technical system.

6. The method as recited in claim 5, wherein the ascertaining of the estimated metadata includes using at least one model, which is configured to ascertain the estimated metadata based on the data transfers of the technical system.

7. The method as recited in claim 5, further comprising: comparing the estimated metadata to the metadata.

8. The method as recited in claim 7, wherein the influencing of the operation of the technical system is performed based on a result of the comparison.

9. The method as recited in claim 7, wherein the influencing includes initiating an error reaction.

10. The method as recited in claim 1, further comprising at least one of the following steps:
    a) evaluating data of the technical system based on the ascertained metadata,
    b) recognizing attempted attacks or detecting an intrusion based on the ascertained metadata,
    c) carrying out a cloud-based intrusion detection method for the technical system based on the ascertained metadata, the technical system including at least one sensor or at least one sensor unit.

11. The method as recited in claim 1, wherein the ascertaining is of the average duration of the data transfer sessions.

12. The method as recited in claim 11, wherein the data transfer sessions are transport layer security sessions.

13. A device configured to process data of a technical system, the device comprising a processor, wherein the processor is configured to:
    monitor a data traffic of the technical system, thereby ascertaining first pieces of information;
    ascertain, as metadata and based on the first pieces of information, at least one of an average frequency at which data transfers of the data traffic occur and an average duration of data transfer sessions of the data traffic; and
    influence an operation of the technical system based on the ascertained metadata.

14. The device as recited in claim 13, further comprising a memory unit accessible by the processor, wherein the memory unit includes a volatile memory in which the first pieces of information are temporarily stored and a non-volatile memory in which is stored a computer program that the processor is configured to execute to carry out the monitoring, ascertainment, and the influencing.

15. A non-transitory computer-readable storage medium on which are stored commands for processing data of a technical system, the commands being executable by a computer and, when executed by the computer, causing the computer to perform the following steps:
    monitoring a data traffic of the technical system, thereby ascertaining first pieces of information;
    ascertaining, as metadata and based on the first pieces of information, at least one of an average frequency at which data transfers of the data traffic occur and an average duration of data transfer sessions of the data traffic; and
    influencing an operation of the technical system based on the ascertained metadata.

* * * * *